Sept. 9, 1924.
P. S. HEINZINGER
1,507,960
LOGGING EQUIPMENT
Filed Oct. 23, 1922
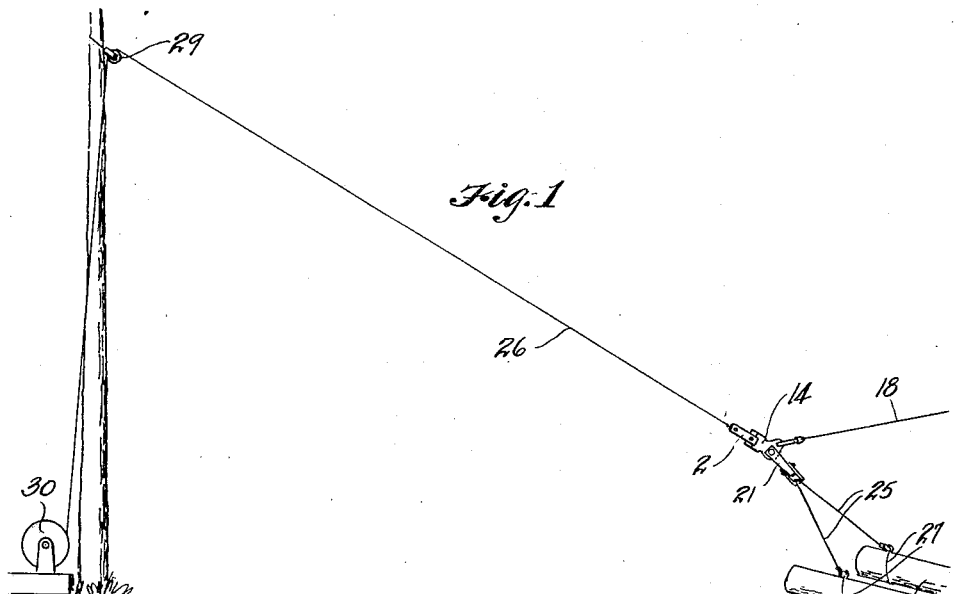
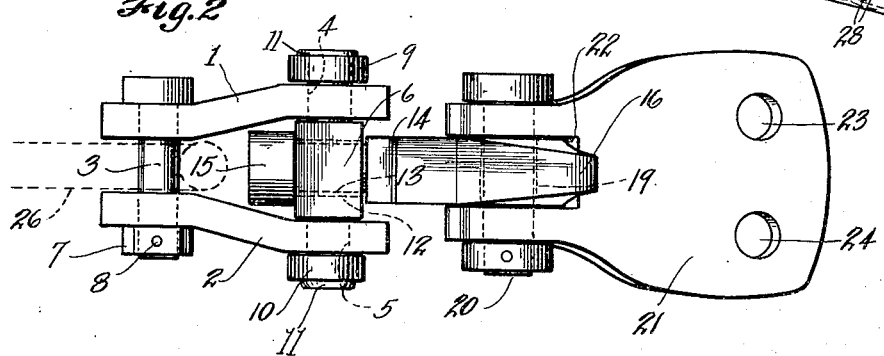
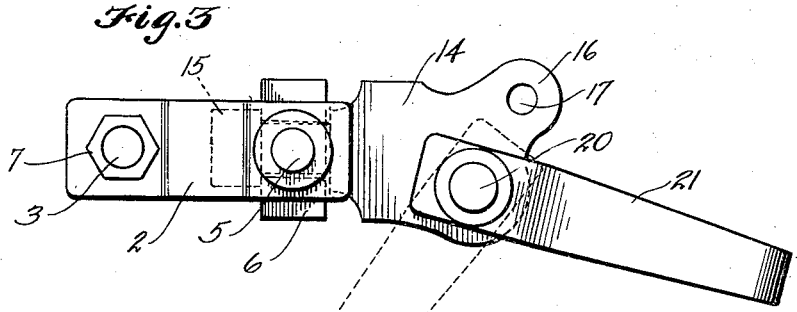
Inventor
PETER S. HEINZINGER
By his Attorney Patented Sept. 9, 1924.

1,507,960

UNITED STATES PATENT OFFICE.

PETER S. HEINZINGER, OF MONROE, WASHINGTON.

LOGGING EQUIPMENT.

Application filed October 23, 1922. Serial No. 596,377.

*To all whom it may concern:*

Be it known that I, PETER S. HEINZINGER, a citizen of the United States, residing at Monroe, in the county of Snohomish and State of Washington, have invented a new and useful Improvement in Logging Equipments, of which the following is a specification.

This invention relates to improvements in logging equipment and more particularly to a swivel device for connecting the main line cable used in high lead logging with the haul back cable and butt lines.

It is the principal object of this invention to provide a device of the above character whereby damage, particularly to the butt line cables due to twisting, is eliminated.

More specifically, the object of the invention resides in the provision of a main line swivel with haul back and butt line connections which will permit the usual twisting of the main cable without causing twisting or unravelling of the log carrying butt lines. Other objects of the invention reside in the various details of construction of the parts embodied in the swivel construction and the association therewith of a plate for the butt line connections.

In accomplishing these and other objects of the invention, I have provided the improved details of construction, the preferred forms of which are shown in the accompanying drawings, wherein—

Figure 1 is a diagrammatic view illustrating the use of a device embodied by the present invention for connecting the main line with butt lines and haul back cable.

Figure 2 is a plan view of the swivel device.

Figure 3 is a side view of the same.

Referring more in detail to the drawings, 1 and 2 designate spaced apart links, forming a part of the swivel, between which, at their outer ends, a bolt 3 is extended and which, at their inner ends, are pivotally mounted on trunnions 4 and 5 projecting from the opposite side of a swivel block 6. The links 1 and 2 are retained on the bolt 3 by means of the bolt head and nut 7 fixed at its opposite end by a pin 8 that is extended through the nut and bolt and they are retained on the trunnions by means of nuts 9 and 10 that are held in place by rivet heads 11.

Centrally of the block 6 is a hole 12 within which the shank 13 of a plate 14 is rotatably mounted. The shank is held within the block by means of a head 15 formed at its end. At the upper rearward end of the plate 14 is an extension 16 having a hole 17 therein for receiving the connecting bolt of a clevis whereby a haul back line or cable, as indicated at 18 in Figure 1, may be attached and at the lower portion of the plate is an opening 19 for receiving a bolt 20 whereby a butt line connecting plate 21 is secured to the plate 14.

The plate 21 has a broad flat body portion provided at one end with a recess 22 for receiving the plate 14 therein and the latter is so formed that the plate 21 may swing pivotally on the bolt 20 between positions shown in full lines and in dotted lines in Figure 3. In the body of the plate, at opposite sides, are openings 23 and 24 for receiving clevis bolts whereby the clevises to which the butt line cables 25 are attached may be connected to the plate.

In using the device the main line cable 26 is connected about the bolt 3, the haul back cable 18 is connected with the plate 14 by means of a clevis having a bolt extended through the aperture 17 and the butt lines 25 are likewise connected by clevises, the bolts of which extend through the apertures 23 and 24. The free ends of the butt lines are equipped with choker hooks which are connected with the cables or lines 27 extended about the logs 28. The main line is extended about a suitable pulley 29 that may be secured to a tree as shown and is then extended to the winding drum of the engine as indicated at 30, then when the logs are drawn in by the engine the usual twisting of the main line cable can take place without causing turning or twisting of the butt line cables and the work is thereby not only greatly facilitated but damage and expense is avoided from unravelling or twisting together of the butt lines.

It is readily apparent that devices of this character can be made in various sizes according to the strength required of them and the details of construction of the various parts can be changed or varied without departing from the spirit of the invention.

Having thus described my invention, what I claim is new and desire to secure by Letters Patent, is:

1. A device of the class described, comprising a swivel block, a pair of links having ends pivotally connected with the opposite sides of the block and means for connecting their other ends with a main line cable, a plate having a shank swivelly fixed in the block and having an opening in its upper portion providing connection for a haul back cable, a second plate pivotally fixed to the lower portion of the first plate and having openings therein for receiving butt line connecting devices.

2. A device of the class described, comprising a swivel block having a central opening and trunnions at its opposite sides, a pair of links having ends pivotally mounted on the trunnions and a bolt extended between their opposite ends for the connection therewith of a main line cable, a plate having a shank extended swivelly through the block opening and a head on the shank for retaining it in the block, said plate having an opening in its upper edge for receiving a haul back cable connection, and a second plate fixed pivotally to the lower edge of the first plate and having openings therein for butt line connections.

3. A device of the class described, comprising a swivel block having a central opening and trunnions at its opposite sides, a pair of links having ends pivotally mounted on the trunnions and a bolt extended between their opposite ends providing connection for a main line cable, a plate having a shank at one end extended swivelly through the block opening and a head on the shank for retaining it in the block, said plate having an extension at its upper rearward edge provided with an opening for receiving a haul back line connecting device, a second plate fixed pivotally to the lower edge of the first plate so that the plates lie in perpendicular planes and the second plate is adapted to swing pivotally in a forward or rearwardly extending direction, the second plate being provided with openings at opposite sides for receiving connecting devices for butt line cables.

PETER S. HEINZINGER.